United States Patent [19]

Miller

[11] Patent Number: 4,699,405
[45] Date of Patent: Oct. 13, 1987

[54] COUPLING FOR COUPLING TUBULAR MEMBERS

[75] Inventor: Jack E. Miller, Houston, Tex.

[73] Assignee: International Clamp Company, Houston, Tex.

[21] Appl. No.: 852,224

[22] Filed: Apr. 15, 1986

[51] Int. Cl.⁴ .............................................. F16L 21/08
[52] U.S. Cl. .................................... 285/338; 285/232; 285/348; 285/341; 285/369
[58] Field of Search ............... 285/232, 338, 348, 347, 285/339, 196, 343, 346, 270, 369, 341, 342, 902, 375

[56] References Cited

U.S. PATENT DOCUMENTS

| | | | |
|---|---|---|---|
| 569,247 | 10/1896 | Smith | 285/346 |
| 1,529,607 | 3/1925 | Owen | 285/338 |
| 1,662,707 | 3/1928 | Hosmer | 285/348 |
| 2,163,810 | 6/1939 | Raybould | 285/348 |
| 2,197,450 | 4/1940 | Curtis | 285/369 |
| 2,318,575 | 5/1943 | Armington | 285/348 |
| 2,567,243 | 9/1951 | Smith | 285/348 |
| 2,647,769 | 8/1953 | Smith | 285/348 |
| 2,755,109 | 7/1956 | Risley | 285/232 |
| 2,779,610 | 1/1957 | Risley | 285/343 |
| 3,045,830 | 7/1962 | Fulton | 285/346 |
| 3,116,546 | 1/1964 | Smith | 29/451 |
| 3,406,748 | 10/1968 | Jarreby | 285/338 |
| 3,494,638 | 2/1970 | Todd | 285/348 |
| 3,649,034 | 3/1972 | Barton | 285/346 |
| 4,569,542 | 2/1986 | Anderson | 285/348 |

FOREIGN PATENT DOCUMENTS

| | | | |
|---|---|---|---|
| 139589 | 1/1949 | Australia | 285/348 |
| 483872 | 6/1952 | Canada | 285/369 |
| 497644 | 11/1953 | Canada | 285/369 |
| 507354 | 11/1954 | Canada | 285/346 |
| 52283 | 10/1936 | Denmark | 285/338 |
| 179151 | 12/1906 | Fed. Rep. of Germany | 285/270 |
| 1475875 | 7/1969 | Fed. Rep. of Germany | 285/346 |
| 445057 | 4/1936 | United Kingdom | 285/346 |
| 599533 | 3/1948 | United Kingdom | 285/346 |
| 944539 | 12/1963 | United Kingdom | 285/341 |

*Primary Examiner*—Cornelius J. Husar
*Assistant Examiner*—Eric K. Nicholson
*Attorney, Agent, or Firm*—Arnold, White & Durkee

[57] ABSTRACT

A coupling for forming a sealed engagement with a tubular member, the coupling comprising an annular housing having an engagement zone for receiving a tubular member to be engaged by the coupling, and comprising an engagement assembly positioned within the engagement zone. The engagement assembly comprises an annular gasket for sealing engagement with a tubular member upon axial compression of the engagement assembly. The annular gasket has a plurality of circumferentially spaced bores. A plurality of bolts for axial compression of the engagement assembly, are positioned to extend through the bores. The engagement assembly includes at least one washer for applying axial pressure to the annular gasket during axial compression of the engagement assembly. The engagement assembly further includes a gripping ring to be radially compressed upon axial compression of the engagement assembly to grip a tubular member when positioned in the engagement zone. The engagement assembly further includes wedge surfaces to cooperate with the gripping ring to resiliently compress the gripping ring into engagement with a tubular member.

25 Claims, 9 Drawing Figures

COUPLING AFTER MAKE-UP

COUPLING BEFORE MAKE-UP

COUPLING FOR COUPLING TUBULAR MEMBERS

This invention relates a coupling. More particularly, this invention relates to a coupling for forming a sealed engagement with a tubular member, or with a plurality of tubular members.

In the field of high pressure pipelines, there is a need for semi-permanent couplings which may be quickly installed to allow for a rapid maintenance turn around of the pipeline. For example, it may be desirable to install a branch into a pipeline, but the desirability and economics of installing such a branch may depend on how long the pipeline will be removed from service. Pipeline owners are typically willing to operate pipelines under reduced pressures for a time after a job has been performed, as long as the pipeline flow can be restored quickly. In such applications, the pipeline operator will typically weld the coupling to the pipeline after flow has been restored to make the coupling permanent and to allow the operating pressure to be increased to its original value.

There is a need for effective couplings which can be rapidly installed, and which can be used either as detachable and reattachable couplings, or can be used as permanent couplings by welding the couplings when made up to the tubular member or members.

Applicant is aware of prior art couplings which are intended to serve this type of function. These couplings are described in U.S. Pat. Nos. 2,567,243 and 3,116,546 of Smith. The couplings disclosed in these patents use a number of bolts which are tightened to grip the pipe, and use a number of bolts which are tightened to squeeze elastomer sealing ring around the pipe. These couplings present certain disadvantages. Because of the large number of bolts which must be tightened to evenly seat the gripping bolts and evenly seat the elastomer seal, the operation is labor intensive and time consuming. The gripping bolts are required to actually dig into the pipe surface causing scarring of the pipe and creating points of stress concentration. Because the gripping power of the bolts is relatively low, the allowable pipeline operating pressure prior to welding is typically much lower than the normal pipeline operating pressure. Further, welding of the coupling is tedious and time consuming since each of the numerous bolts must be torch cut and must then be welded to insure a permanent seal.

It is an object of this invention to provide a coupling which can overcome or reduce at least some of the disadvantages of the prior art couplings.

According to one aspect of the invention, there is provided a coupling for forming a sealed engagement with a tubular member, the coupling comprising an annular housing having an engagement zone for receiving a tubular member to be engaged by the coupling, and comprising an engagement assembly positioned within the engagement zone, the engagement assembly comprising:

(a) annular gasket means for sealing engagement with walls defining the engagement zone and with a tubular member received within the engagement zone during use, upon axial compression of the engagement assembly, the annular gasket means having a plurality of circumferentially spaced bores;

(b) a plurality of bolts for axial compression of the engagement assembly, the bolts being positioned to extend through the bores;

(c) at least one washer means for applying axial pressure to the annular gasket means during axial compression of the engagement assembly;

(d) gripping means to be displaced radially upon axial compression of the engagement assembly to grip a tubular member positioned in the engagement zone; and (e) wedge means to displace the gripping means upon axial compression of the engagement assembly.

The engagement assembly may be positioned within the engagement zone to be removable from the engagement zone as an assembly or to be axially displaceable along the engagement zone. In accordance with this aspect of the invention, the annular housing may be supplied with a separate engagement assembly which is adapted for use with the annular housing. To make up the coupling, the engagement assembly may be positioned over the end of a tubular member, the annular housing may be positioned over the tubular member for the engagement zone to be axially aligned with the engagement assembly. These axial positions may then be maintained during compression of the engagement assembly to engage with the walls defining the engagement zone and with the tubular member received within the engagement zone.

In an alternative aspect of the invention, the annular housing may include a radial flange to locate the engagement assembly in the engagement zone.

The radial flange may conveniently extend radially inwardly from a free end portion of the engagement zone. The radial flange preferably has the bolts associated therewith to thereby locate the engagement assembly in position in the engagement zone. Conveniently the bolts may extend through circumferentially spaced bores within the radial flange.

The bolts are preferably positioned within the engagement zone so that they do not project beyond the axial end of the annular housing.

In a preferred embodiment of the invention, the bolts are in the form of socket head bolts to facilitate their actuation even though they do not project beyond the axial end of the annular housing. In this embodiment of the invention, the bores of the radial flange are preferably shaped to house the heads of the bolts.

The bolts of the engagement assembly may be adapted in various ways to be actuated to axially compress the engagement assembly. Thus, for example, the bolts may be engaged with threaded bores provided in the radial flange to compress the engagement assembly between the heads of the bolts and the radial flange. In an alternative example, the bolts may be engaged with threaded bores provided in the washer means for axially compressing the engagement assembly between the washer means and the heads of the bolts or the radial flange.

In a preferred embodiment of the invention, the coupling includes nuts which are threaded onto the free ends of the bolts.

The washer means may be in any suitable form which can serve to apply axial pressure to the annular gasket means during axial compression of the engagement assembly to cause the gasket means to form a sealing engagement with a tubular member and with the walls defining the engagement zone during use.

In a preferred embodiment of the invention the washer means comprises an annular washer which is positioned between the annular gasket means and the nuts so that the nuts will bear against the annular washer during axial compression of the engagement assembly.

In an alternative preferred embodiment of the invention, the washer means may comprise a pair of annular washers which are positioned on either side of the annular gasket means to axially compress the annular gasket means between them during use.

The gripping means may be any suitable means which can be displaced or deformed in a radial direction during use to form a gripping engagement with a tubular member positioned in the engagement zone, upon axial compression of the engagement assembly.

In a preferred embodiment of the invention, the gripping means includes at least one wedge surface which is inclined or tapered relatively to the polar axis of the coupling. In this embodiment the wedge means comprises at least one complementary wedge surface to compress the gripping means radially inwardly during use.

The complementary wedge surface may be provided on the washer means, on a wedge member included in the engagement assembly, on the radial flange, on the bolts, on the nuts, or on several of these elements.

The gripping means may comprise a plurality of circumferentially spaced gripping segments which are arranged in an annular configuration. In this embodiment the bolts may extend between adjacent gripping segments. Alternatively, the gripping means may comprise at least one axially split gripping ring.

The gasket means and the gripping means are preferably positioned so that they are actuated at the same time when the bolts are actuated to axially compress the engagement assembly. The annular gasket means is thus preferably positioned in a load path between the gripping means and the bolts, to maintain a resilient bias effect on the gripping means when the coupling has been made up.

In one application of the invention the gripping means may comprise a plurality of gripping rings and the wedge means may comprise a plurality of tapered or inclined wedge surfaces to cooperate with the gripping rings during use to radially compress the gripping rings.

In this embodiment of the invention a greater gripping force can be achieved by utilizing additional gripping rings. In this embodiment, if desired, additional annular gasket means may be included to provide additional security for the sealing engagement.

Where the coupling of this invention has a single engagement zone with an engagement assembly position therein, the coupling may form a sealing engagement with a single tubular member. The free end of the coupling which is at the opposed end to the end where the engagement zone is provided, may then be an end which is or can be engaged with a further tubular member by means of welding, by means of a conventional flange or the like. The free end may thus have or be provided with a coupling formation of any conventional or suitable type for its intended application.

In an alternative embodiment of the invention, where the coupling is to be used for connecting a pair of tubular members in sealed engagement, the annular housing has a pair of engagement zones for each engagement zone to receive one of the tubular members, each engagement zone having an engagement assembly position therein.

Embodiments of the invention are now described by way of example with reference to the accompanying drawings.

In the drawings.

Figure 1:
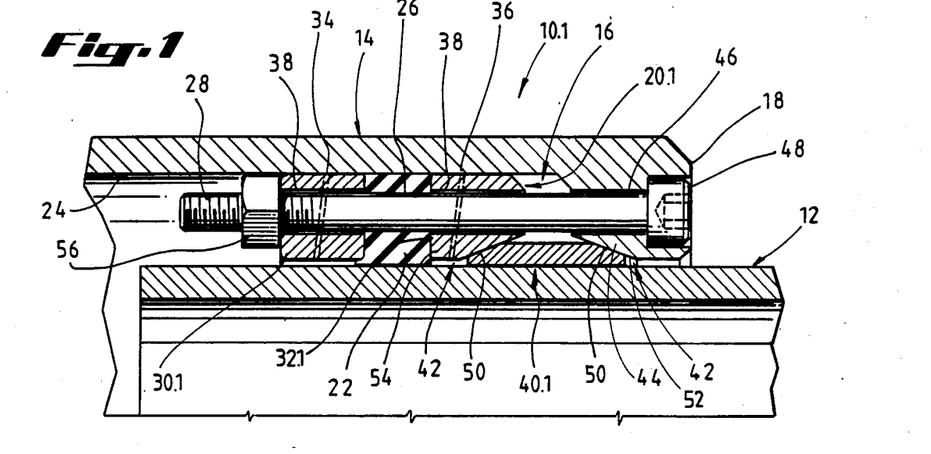
FIG. 1 shows a fragmentary sectional side elevation of a preferred embodiment of a weldable mechanical coupling in according with this invention for use in forming a sealed engagement with tubular members in the form of high pressure pipes. The coupling shown in FIG. 1, shows only one end portion of the coupling to be engaged with a tubular member in the form of a high pressure pipe positioned therein. The other corresponding portion of the coupling to be engaged with a second tubular member or pipe, is not shown in FIG. 1.

With reference to FIG. 1 of the drawings, reference numeral 10.1 refers generally to a weldable mechanical coupling for use in forming a sealed engagement with a pair of tubular members in the form of high pressure pipeline sections 12.

The coupling 10.1 comprises an annular housing 14 having a pair of corresponding engagement zones 16 at its axially opposed ends 18. In FIG. 1, only one engagement zone 16 of the coupling 10.1 and only one axial end 18 are shown. The coupling 10.1 does, however, have a corresponding engagement zone 16 which is not shown, which corresponds with the engagement zone 16 and is proximate to the opposed axial end 18 (also not shown) of the annular housing 14. The engagement zone 16 is shown having one pipeline section 12 positioned therein for engagement by the coupling 10.1 during use. A second pipeline section 12 (not shown) would be engaged by the second engagement zone 16 (not shown) to thereby connect the two pipeline sections 12 in sealed engagement with each other.

The two engagement zones 16 are identical, and each engagement zone 16 includes an identical engagement assembly 20.1.

Each engagement assembly 20.1 comprises annular gasket means in the form of an annular gasket 22 for sealing engagement with the walls 24 defining the engagement zone 16 and with the pipeline section 12 which is received within the engagement zone 16 during use, upon axial compression of the engagement assembly 20.1.

The annular gasket 22 has a plurality of circumferentially spaced bores 26.

The engagement assembly 20.1 further comprises a plurality of bolts 28 which are adapted to be actuated for axial compression of the engagement assembly 20.1. The bolts 28 are positioned to extend through the bores 26 of the annular gasket 22.

The bores 26 are smaller in diameter than the bolts 28 to create a positive interference between the bolts 28 and the walls defining the bores 26 of and the annular gasket 22 thereby reduce the possibility of leakage.

In a presently preferred embodiment of the invention, the bores 26 have diameters which are about 10% smaller than the diameters of the bolts 28.

The engagement assembly 20.1 further includes washer means in the form of a first annular washer 30.1, and a second annular washer 32.1 which are positioned on opposed sides of the annular gasket 22 for compressing the annular gasket 22 axially between them during axial compression of the engagement assembly 20.1.

Each of the first and second annular washers 30.1 and 32.1 is split into two semi-circular rings by means of diametrically opposed split lines 34 and 36 respectively.

Each split line 34 and 36 is a skive cut which extends at an acute angle, preferably an angle of about 30° to the axial end of the washer 30.1 or 32.1, as the case may be.

The washers 30.1 and 32.1 are split along the split lines 34 and 36 to allow them to be inserted into the engagement zone 16, and then to be assembled.

Each of the washers 30.1 and 32.1 has bores 38 at circumferentially spaced intravals, through which the bolts 28 extend.

The skive cuts along the split lines 34 and 36 are made so that they each intersect one of the bores 38 as shown in FIG. 1. In this way the bolts 28 when inserted through the bores 38, engage the two halves and keep the two halves of the washer 30.1, and the two halves of the washer 32.1 together in coherent annular rings.

Each engagement assembly 20.1 further includes gripping means 40.1. In the preferred embodiment of FIG. 1, the gripping means 40.1 comprises an annular gripping ring.

The annular gripping ring 40.1 has an axial split of sufficient width and is resiliently flexible to allow it to be radially compressed for insertion into the engagement zone 16, and for radial displacement inwardly upon axial compression of the engagement assembly 20.1 to grip the tubular member or pipeline section 12 in the engagement zone 16 during use.

The engagement assembly 20.1 further includes wedge means 42 to displace the gripping means 40.1 upon axial compression of the engagement assembly 20.1.

The annular housing 14 includes a radial flange 44 at each axial end 18 of the housing 14.

Each radial flange 44 extends radially inwardly from the free end portion of the engagement zone 16 to locate the engagement assembly 20.1 axially within the engagement zone 16.

Each radial flange 44 has a plurality of circumferentially spaced bores 46 through which the bolts 28 extend.

Each bolt 28 is in the form of a socket head bolt having a socket head 48. Each of the bores 46 is shaped to house the socket head 48 within the bore 46 so that the free end of the socket head 48 is flush with the axial end 18 of the annular housing 14.

Because of the use of socket heads 48, the bolts 28 can readily be actuated during use and yet remain flush with the axial ends 18 of the annual housing 14.

If it is desired to convert the coupling 10.1 into a permanent coupling after it has been made up, the outer end of each radial flange 44 can be welded to the pipeline section 12. The welding procedure is simplified and improved by the presence of the radial flanges 44. In addition, because of the positioning of the socket heads 48 within the bores 46, the normal weld geometry used for permanently attaching the coupling 10.1 to the pipeline section 12, will also cover the bolt heads 48. Thus, the welding operation can simultaneously attach the coupling to the pipeline sections and permanently seal the coupling. This provides the advantage that welding is facilitated and there is no requirement to cut off bolt heads prior to welding.

The gripping ring 40.1 preferably has, as shown in FIG. 1, a pair of wedge surfaces 50 which are inclined or tapered relatively to the polar axis of the coupling 10.1. While the gripping means 40.1 may have a single wedge surface 50, a pair of wedge surfaces as shown in FIG. 1 will provide an increased gripping force onto the pipeline section 12 during use.

The wedge means 42 comprises complementary wedge surfaces 52 and 54 on the radial flanges 44 and second annular washer 32.1 respectively.

During axial compression of the engagement assembly 20.1, the complementary wedge surfaces 52 and 54 cooperate with the wedge surfaces 50 of the gripping ring 40.1 to radially compress the gripping ring 40.1 into engagement with the pipeline section 12 during use.

The engagement assembly 20.1 further includes a plurality of nuts 56 which are engaged with the bolts 28.

The bolts 28 are positioned in the engagement zone 16 so that the flat surfaces of the nuts 56 abut the walls 24 of the engagement zones 16. The walls 24 thus prevent the nuts 56 from rotating during actuation of the bolts 28.

When the coupling 10.1 is to be used, no special preparation of the pipeline sections 12 is necessary.

The coupling 10.1 is sized so that the annular housing 14 and the engagement assemblies 20.1 positioned therein can slide freely over the pipeline sections 12. The pipelines sections 12 can thus be positioned to extend into the annular housing 14 from opposed ends thereof, so that the inner end portion of each pipeline section 12 is received within one engagement zone 16 of the annular housing 14.

In each engagement zone 16, the coupling 10.1 is then activated by tightening the bolts 28 in a repeating alternating fashion until the specified bolt torque is achieved. As the bolts 28 are tightened relatively to the nuts 56, the first annular washer 30.1 is drawn axially towards the radial flange 44 to axially compress the engagement assembly 20.1.

As the engagement assembly 20.1 is axially compressed the annular gasket 22 is compressed between the first and second annular washers 30.1 and 32.1. At the same time the second annular washer 32.1 engages with the gripping ring 40.1 to force the gripping ring 40.1 axially into engagement with the radial flange 44. During further tightening of the bolts 28, the complementary wedge surfaces 52 and 54 engage with the wedge surfaces 50 to radially compress the gripping ring 40.1 inwardly until it engages with the surface of the pipeline section 12.

Further tightening of the bolts 28 will further compress the annular gasket 22 axially between the annular washers 30.1 and 32.1 to force the annular gasket 22 to expand radially outwardly and to contract radially inwardly until it forms a sealed engagement with the outer wall of the pipeline section 12 and with the walls 24 of the engagement zone 16 to form a sealed engagement between the coupling 10.1 and the pipeline section 12.

At the same time, the engagement between the annular gasket 22 and the bolts 28 extending through the bores 26, will increase to force a tight seal around the bolts 28 and thereby reduce the tendency for leakage to occur through the bores 26.

Once both engagement assemblies 20.1 of the coupling 10.1 have been made up, flow of fluid through the sealingly engaged pipeline sections 12 can be initiated or restarted. The permissible pressure will depend upon the sealing capabilities and properties of the annular gaskets 22. With appropriate design, pressure ratings comparable to those provided by the pipeline sections 12, can be provided by the coupling 10.1.

If it is desired to make the coupling 10.1 a permanent coupling, the coupling 10.1 can be welded to the pipeline sections 12 along the junctions of the axial ends 18 of the radial flanges 44 and the pipelines sections 12. Such welding will at the same time seal the socket heads 48 to form a permanently sealed pipeline coupling.

The coupling 10.1 and the couplings in accordance with this invention may generally be used under conditions in which it is difficult to achieve precise alignment of pipeline sections such as would be necessary for direct welding between pipe ends. Such conditions occur particularly when installing a branch line into an existing line that is buried or is otherwise anchored so that the pipe ends cannot be moved.

They may also be used in conditions in which mechanical coupling of the pipeline sections is much quicker than welding and in which time is of the essence.

They may also be used in conditions where it may be hazardous to strike a welding arc because of fumes or vapors that may be present from exposed pipe bores or from previous leakage, but where it will be safe to weld after the pipe has been coupled and is in operation.

They may also be used in situations where it may be necessary to uncoupled the pipe at a future time and it is undesirable to have a permanent pipe joint such as a welded joint.

They may also be used in situations where it is necessary to couple pipes in welding restricted areas of refineries and chemical plants.

The embodiment of the invention as illustrated in FIG. 1, can provide a number of advantages.

The coupling 10.1 allows modification or replacement of pipelines sections to be performed rapidly.

The gripping force provided by the bolts 28 is multiplied by the wedging angles of the wedge surfaces 50 and complementary wedge surfaces 52 and 54. A single 20° taper angle will tend to provide a gripping force multiplication of more than double the applied bolt force even when friction is taken into consideration. Where double wedge surfaces are employed as in FIG. 1, the gripping force on the pipeline section would be doubled.

The design of the coupling 20.1 is compact and light in weight since no additional annular space is required for the bolting other than that already employed for the engagement assembly. This provides a high strength density.

Because the annular gasket 22 is positioned in the load path between the bolts 28 and the gripping means 40.1 both the sealing effect providing by the annular gasket 22 and the gripping effect provided by the gripping ring 40.1 are activated in the same bolting process. This eliminates the need for additional mechanisms. In addition, because of the positioning of the annular gasket 22 in the load path, the gasket 22 will continue to maintain a resilient bias effect or spring effect to provide a fairly constant load on the gripping ring 40.1. This resiliency can have a beneficial effect in maintaining an effective grip even though the pipeline section 12 may be subject to expansion and contraction from thermal or pressure forces.

Because of the construction of the coupling 10.1, pressure within the pipeline will tend to force the annular gasket 22 and the gripping means 40.1 more tightly around the pipeline section 12, thereby increasing the holding ability of the coupling 10.1. The bolts 28 will therefore experience a reduction in load in response to a high tension load (or pressure) in the pipe as opposed to an increase in loading which could tend to overstress the bolts. The bolts therefore only need to be designed so that they are sufficient to effectively seat the annular gasket and the gripping means. There is no requirement that the bolts should be designed for the pipeline loads.

Many of the advantages of the coupling of this invention, particularly the coupling 10.1, flow from the fact that the bolts 28 extend through bores 26 in the annular gasket 22. This allows the use of a compact annular space for the engagement zone 16. This also allows the annular gasket 22 to be effectively positioned in the load path for the bolting action.

The radial flanges 44 which provides the taper angle, afford the advantage that they provide additional materials for the annular housing 14 in the area of the bolt heads, where it is most needed. The internal taper angles in the housing 14 are also a good geometry for transferring the pipeline loads once the coupling 10.1 has been permanently welded to the pipeline section.

The annular housing 14 may be made of a variety of materials which are available for this purpose. Thus it may be made of various alloy steels. Where the coupling is designed to be welded in certain instances, the annular housing 14 should be made of an easily weldable alloy steel.

If a sufficient volume of annular housings 14 can be made at the same time, the housing 14 will preferably made as a casting of a weldable alloy such as ASTM (American Society for Testing of Materials) A-216 Grade WCC.

If the annular housing 14 is not made as a casting, then for pipe sizes less than about 16" in diameter a thick walled tubing of easily weldable carbon steel, such as for example ASTM A-106 Grade B would presently be preferred. For pipe sizes greater than about 16" in diameter it is preferred to use plates which are rolled into cylinders and then welded, using a material such as ASTM-A-574 Grade 70 as the presently preferred material.

The gripping means may be made of any of the low alloy steel materials mentioned for the annular housing 14, or of any other available suitable materials.

In a preferred embodiment of the invention, such a low alloy steel will be used to manufacture the gripping means, and it will be provided with a roughened inner surface. After machining, the internal surface is coated with tungsten carbide applied by a hot plasma spray process. This process is much more cost effective than heat treatment processes and provides the required surface hardness necessary to provide an effective gripping action on a pipe. Additionally, the deposited tungsten carbide will provide a roughened surface texture need for best gripping. This is Applicant's presented preferred material for the gripping means, thereby avoiding the use of expensive high alloy steels.

The annular washers 30.1 and 32.1 may be made of the same materials as discussed with reference to the annular housing 14. If necessary, however, higher alloy steels may be used.

The bolts 28 may be made of any conventional materials which will provide the necessary yield strengths and tensile strength for the particular coupling designs. The presently preferred material for socket head bolts 28 of the type illustrated in FIG. 1, are in accordance with ASTM A574, which gives a yield strength of about 157,000 psi, and a tensile strength of about 170,000 psi.

The components of the coupling 10 may, however, be made of any conveniently suitable materials which can serve their required purpose to meet the parameters of the particular design.

Insofar as the annular gasket 22 is concerned, there are a number of standard materials of different types which are commercially available. Gaskets can be molded to specification.

Various synthetic rubbers are, for example, available which are suitable for seals of the annular gasket 22 type.

For line temperatures below about 300° F. buna nitrile synthetic rubbers are generally preferred. For temperatures at 300° F. or higher, fluoro elastomers, such as those for example available under the trademark "VITON" are currently preferred.

Silicon sealing materials are also sometimes capable of being used.

The particular material for the annular gasket 22 depends on the chemical composition of the pipeline, the operating temperature, and the operating pressure. From these parameters persons of ordinary skill in the art can readily select appropriate seal materials from those commercially available.

Seal materials are graded by a standard, referred to as a durometer reading, which gives an indication of the stiffness of the rubber.

The preferred seal material for average conditions, is a buna nitrile seal operating at a-temperature of less than 250° F. For an ANSI class 600 rating (that is 1,480 psi at ambient temperatures), a durometer reading of 70 to 75 is preferred.

The coupling of this invention may be designed by a conventional techniques using available standard specifications. Thus, for example, the thickness of the annular housing 14 may be determined by ASME codes for pressure vessel wall thicknesses. The bolting may, for example, be sized by applying preferably twice the contained pressure to the annular gasket 22, and then calculating the bolt loading accordingly.

To increase the load capability of the coupling 10.1, and to increase the leak resistance, the number of bolts may be increased.

While the wedge surfaces in the embodiment of FIG. 1 have been shown as linear surfaces which are at appropriate angles to the polar axis of the coupling 10.1, other wedging configurations may equally be employed. Thus, for example, the wedge means may be in the form of conical surfaces such as convex or concave surfaces.

An alternative embodiment of the invention is now described by way of example with reference to FIGS. 2-5 of the drawings. The coupling 10.2 illustrated in these figures of the drawings, corresponds generally with the coupling 10.1 of FIG. 1. Corresponding parts are therefore indicated with corresponding reference numerals.

Figure 2:
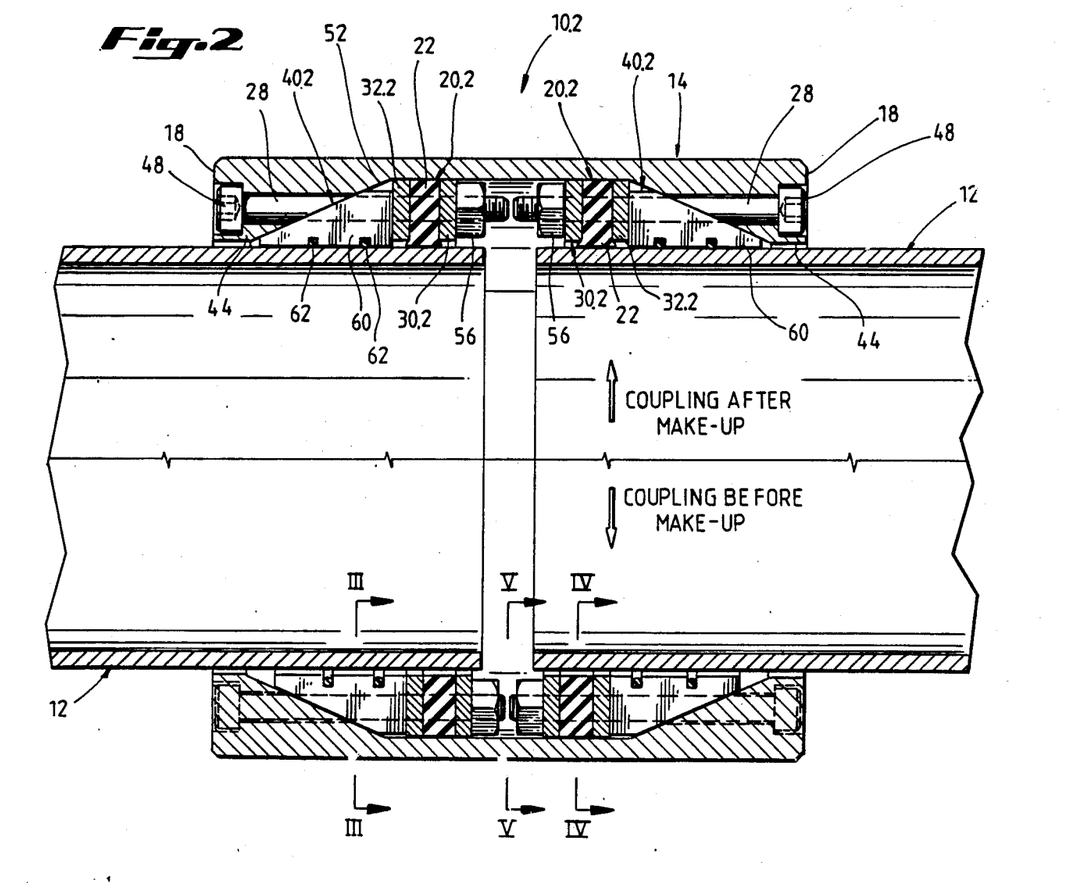
FIG. 2 shows, to a reduced scale, a fragmentary, partly sectional, side elevation of an alternative embodiment of a weldable mechanical coupling in accordance with this invention. The coupling in FIG. 2 has two corresponding ends for engaging the free ends of two tubular members. The upper portion of FIG. 2 shows the coupling in position after having been made up, whereas the lower portion in FIG. 2 shows the coupling before make up.

In the coupling 10.2 the first and second annular washers 30.2 and 32.2 are in the form of annular bands which do not have any wedge surfaces like the second annular washer 32.1 in FIG. 1. They are, however, positioned on opposed sides of the annular gasket 22 in each of the engagement assemblies 20.2.

The coupling 10.2 further differs from the coupling 10.1 in that the gripping means 40.2 is not in a form of a split gripping ring, but is instead in the form of a plurality of segments 60 which are positioned in circumferentially spaced intervals in an annular gripping band. The segments 60 are held in place by annular retaining clips 62.

Each segment 60 has a wedge surface 50 to cooperate with a complementary wedge surface 52 of the radial flange 44.

Figure 3:
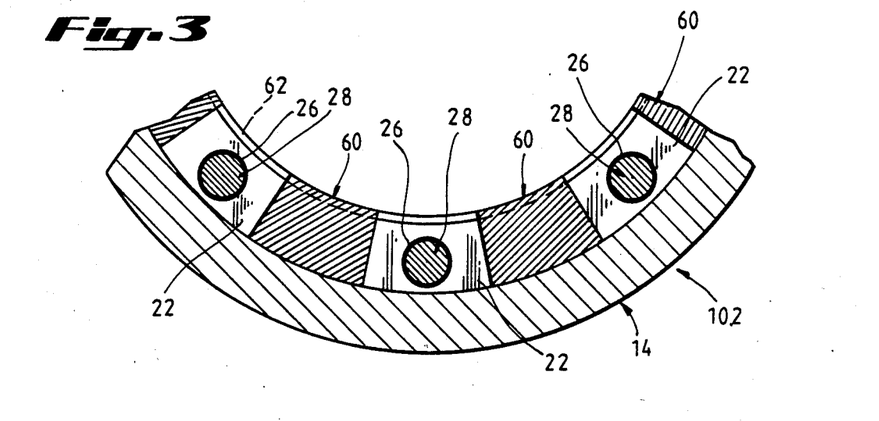
FIG. 3 shows, to a enlarged scale, a fragmentary view along line III—III of FIG. 2.
Figure 4:
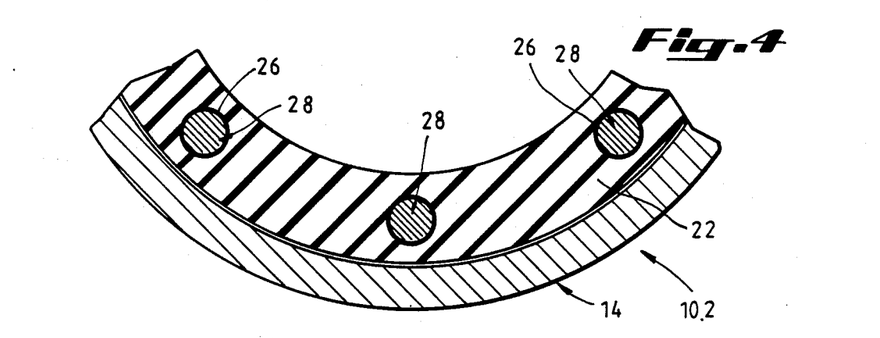
FIG. 4 shows a view similar to that of FIG. 3, but along line IV—IV of FIG. 2.
Figure 5:
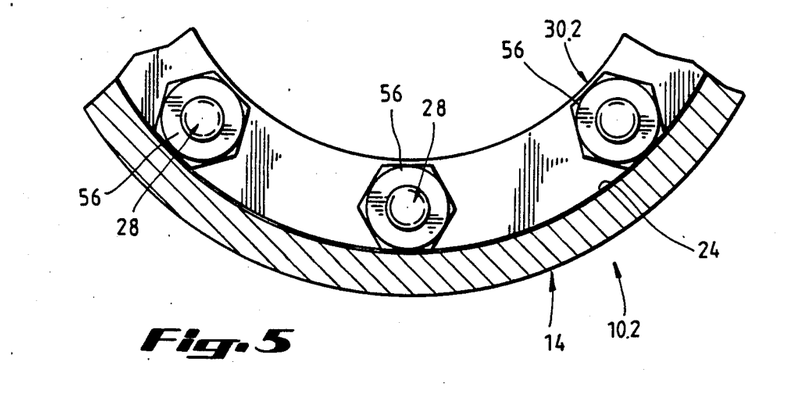
FIG. 5 shows a view similar to that of FIG. 3, but along line V—V of FIG. 2.

The particular arrangement of the segments 60, the bolts 28 and the annular gasket 22, as well as the nuts 56 is shown in detail in FIGS. 3, 4 and 5, which are on an enlarged scale to the drawing of FIG. 2.

The lower half of FIG. 2 shows the coupling 10.2 in the position in which it is prior to make up, whereas the upper half of FIG. 2 shows the coupling 10.2 in its made up condition where it has sealingly engaged with the two pipeline sections 12 to connect them in sealing engagement.

As can be seen particularly in FIG. 3 of the drawings, the segments 60 for each gripping means 40.2 can be made up of one annular gripping ring which is cut into segments, with half the segments being used for one gripping member 40.2 and the other half of the segments being used for the other gripping member 40.2.

The segments 60 are circumferentially spaced so that the bolts 28 extend through between adjacent segments 60.

In the coupling 10.2 the second annular washers 32.2 may be split in diametrically opposed zones with the splits coinciding with the bolt holes, so that the nuts 56 will cover the splits. The annular washers 30.2 will likewise be diametrically split in two opposed regions. In this instance, however, the splits will be positioned to be centered on the segments 60.

Figure 6:
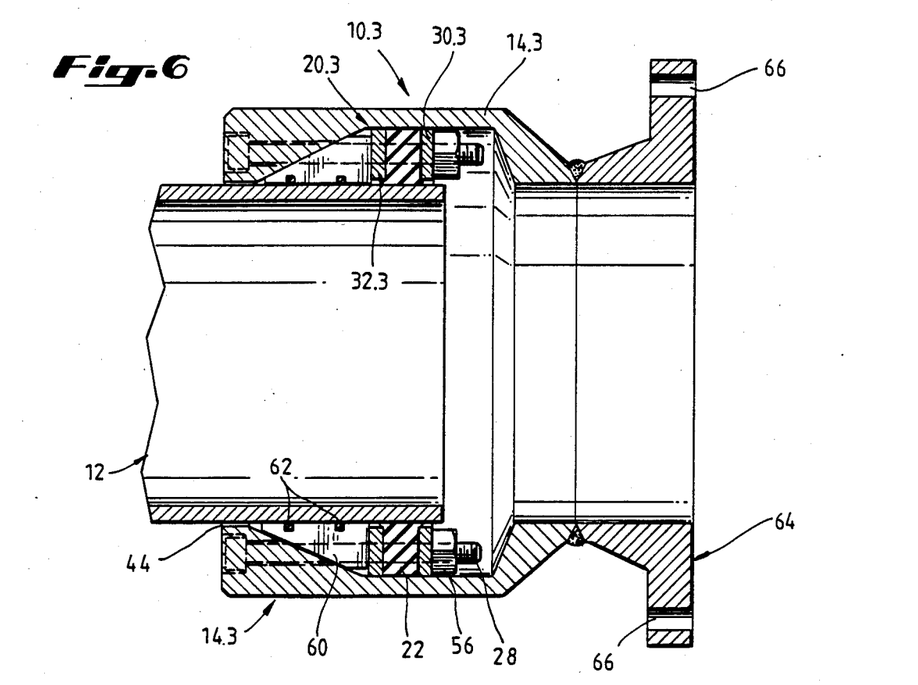
FIG. 6 shows a fragmentary, partly sectional side elevation of an alternative embodiment of a coupling in accordance with this invention, which is made up with one tubular member and has a coupling flange for use in making up the coupling to another corresponding flange.
Figure 7:
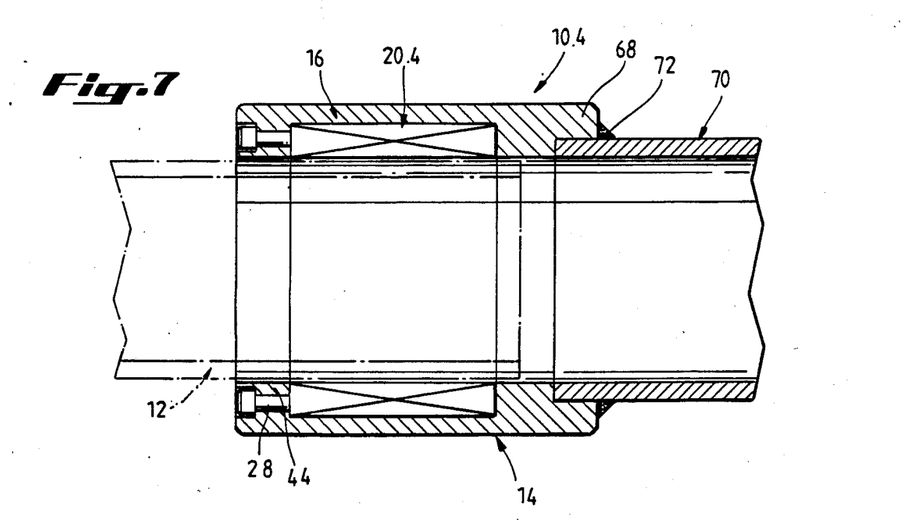
FIG. 7 shows a fragmentary, sectional, side elevation of an alternative embodiment to that illustrated in FIG. 6, where the coupling has coupling flange used for welding the coupling to a riser.

With reference to FIGS. 6 and 7 of the drawings, reference numerals 10.3 and 10.4 refer generally to alternative embodiments of couplings in accordance with this invention. Each of the couplings 10.3 and 10.4 includes only a single engagement zone 16 wherein an engagement assembly 20.3 or 20.4 is positioned.

Each of the couplings 10.3 and 10.4 can therefore be sealingly engaged with a pipeline section 12 as shown on the left hand side of each of FIGS. 6 and 7.

The engagement assembly 20.3 corresponds generally with the engagement assembly 20.2 of FIG. 2, whereas the engagement assembly 20.4 corresponds generally with the engagement assembly 20.1 of FIG. 1.

In FIG. 6 of the drawings, the coupling 10.3 has a coupling formation in the form of a coupling flange 64 welded to the free end of the annular housing 14.3. The coupling flange 64 is a flange of conventional type which can be bolted to a complementary flange by means of bolts extending through circumferentially spaced bores 66.

The coupling 10.4 is particularly adapted for use with offshore riser connections. Thus the coupling 10.4 has a coupling formation in the form of a coupling socket 68 provided at the free end of the annular housing 14. The coupling socket 68 is in the form of a socket which is shown having a riser pipe 70 mounted therein by welding at 72.

Figure 8:
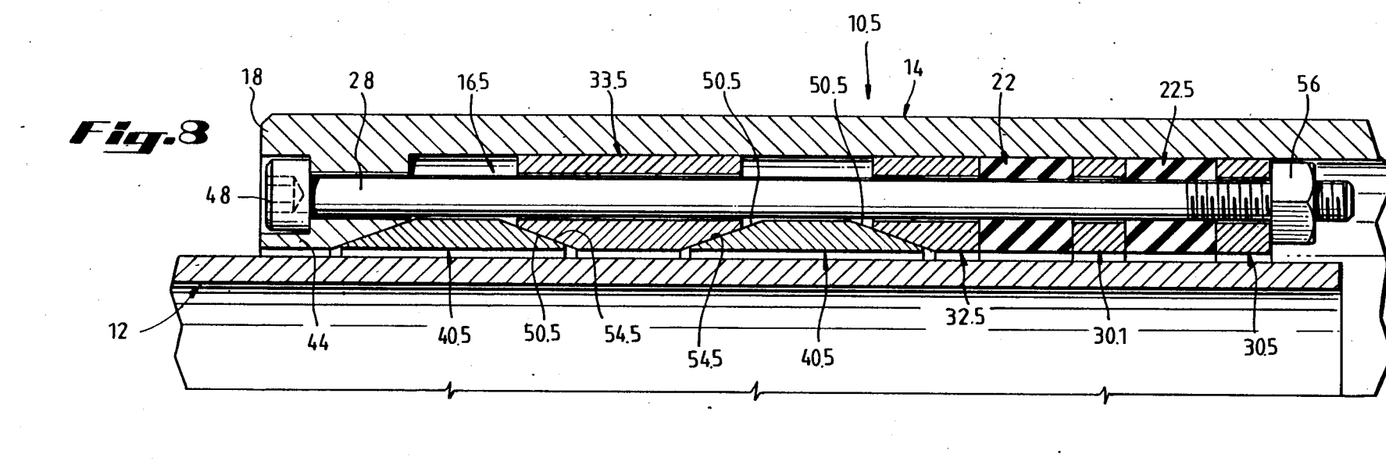
FIG. 8 shows a fragmentary, sectional, side elevation of portion of an alternative embodiment of a coupling in accordance with this invention.

With reference to FIG. 8 of the drawings, reference numeral 10.5 refers to yet a further alternative embodiment of a coupling in accordance with this invention.

The coupling 10.5 corresponds essentially with the coupling 10.1 of FIG. 1. Corresponding parts are therefore indicated by corresponding reference numerals.

The coupling 10.5 differs from the coupling 10.1 in that the coupling 10.5 includes a pair of gripping rings 40.5 in each engagement zone 16.5, instead of a single gripping ring 40.1 in each engagement zone 16 as in the case of the coupling 10.1.

The coupling 10.5 therefore includes a first annular washer 30.5 and a second annular washer 32.5 which correspond with the annular washers 30.1 and 32.1. However, to cooperate with the additional gripping means 40.5, the coupling 10.5 includes an additional third annular washer 33.5 in each engagement zone 16.5.

The third annular washer 33.5 is loosely positioned on the bolts 28 to be axially displaceable relatively to the bolts 28 during use. The third annular washer 33.5 has a pair of complementary wedge surfaces 54.5 to cooperate with the wedge surfaces 50.5 of the adjacent gripping rings 40.5.

By doubling the gripping means 40, the gripping strength may be greatly increased without requiring additional bolting and without any increase in the diametral dimensions of the coupling.

The coupling 10.5 further includes an additional annular gasket 22.5 and an additional annular washer 30.5 to provide additional sealing security in the event of one of the annular gaskets 22 or 22.5 failing to provide an effective seal.

If additional gripping strength is required, or additional sealing security is required, additional gripping means 40 or additional annular gaskets 22 may be included, as required.

Figure 9:
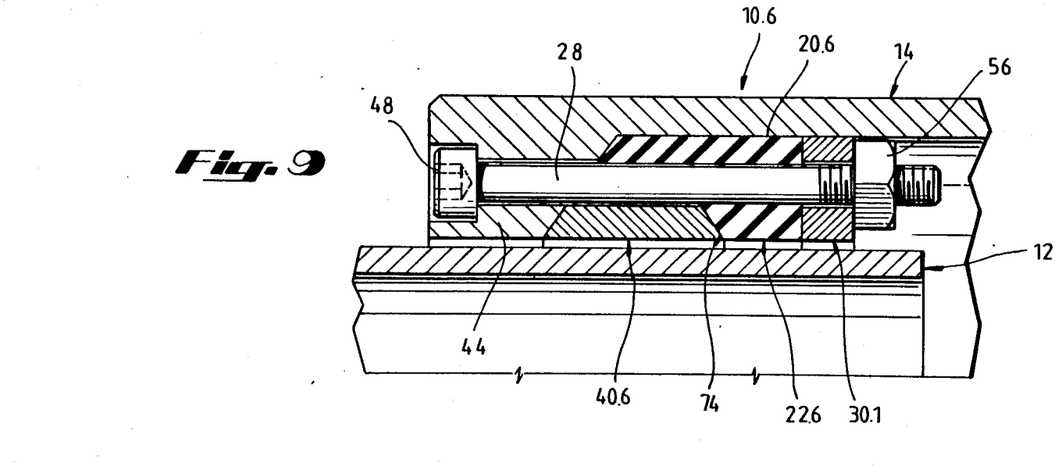
FIG. 9 shows a fragmentary sectional side elevation of yet a further alternative embodiment of a coupling in accordance with this invention.

With reference to FIG. 9 of the drawings, reference numeral 10.6 refers to yet a further alternative embodiment of a coupling in accordance with this invention. The coupling 10.6 corresponds generally with the coupling 10.2 as shown in FIG. 2 of the drawings, except that the annular gasket 22.6 is shaped to cooperate directly with the gripping means 40.6. Thus, the annular gasket 22.6 will radially compress the gripping means 40.6 into engagement with the pipeline section 12 when the engagement assembly 20.6 is axially compressed by activation of the bolts 28. At the same time, as before, the annular gasket 22.6 will be radially expanded into engagement with the annular housing 14, and will be radially contracted into sealing engagement with the pipeline section 12.

The coupling 10.6 includes anti-extrusion means 74 which extends between the annular gasket 22.6 and the gripping means 40.6, to prevent undue extrusion of the annular gasket 22.6 in the axial direction during radial compression of the gripping means 40.6.

The anti-extrusion means may be of any conventional type, such as circumferentially overlapping plates or the like, which may be engaged with the annular gasket 22.6, to prevent undue axial extrusion between the bolts 28 and the annular gripping means 40.6.

Where the coupling of this invention is designed for use without the coupling being welded after installation, such as for instance in a subsea pipeline installations, the strength of the coupling may be increased by making the taper angles more shallow, lengthening the gripping contact area and increasing the total bolting capability.

What is claimed is:

1. A coupling for forming a sealed engagement with a tubular member, the coupling comprising an annular housing having an engagement zone for receiving such a tubular member to be engaged by the coupling, and comprising an axially compressible engagement assembly positioned within the engagement zone, the engagement assembly comprising:
    (a) annular gasket means for sealing engagement with an inner wall on the housing which defines the engagement zone and with such a tubular member received within the engagement zone upon axial compression of the engagement assembly, the annular gasket means having a plurality of circumferentially spaced axially extending bores;
    (b) axial compression means for axial compression of the engagement assembly, the compression means comprising:
    a plurality of bolts having threaded ends positioned to extend through the bores; and
    nut means for threading onto the threaded ends of the positioned bolts, the nut means being positioned to thread the threaded ends in a manner to apply axial compression on the engagement assembly upon actuation of the bolts relatively to the nut means;
    (c) at least one washer means for applying axial pressure to the annular gasket means during axial compression of the engagement assembly;
    (d) gripping means to be displaced radially inwardly upon axial compression of the engagement assembly to grip such a tubular member positioned in the engagement zone; and
    (e) wedge means including complementary surfaces inclined so as to displace the gripping means radially inwardly upon axial compression of the engagement assembly.

2. A coupling according to claim 1, in which the annular housing includes a radial flange which extends radially to locate the engagement assembly axially in the engagement zone.

3. A coupling according to claim 2, in which the radial flange extends radially inwardly from a free end portion of the engagement zone, and has circumferentially spaced bores through which the bolts extend.

4. A coupling according to claim 3, in which the bolts are in the form of socket head bolts, and in which the bores of the radial flange are shaped to house the heads of the bolts.

5. A coupling according to claim 1, wherein the nut means comprises nuts which are threaded onto the free ends of the bolts.

6. A coupling according to claim 5, in which the nuts are positioned on the bolts to engage with inner walls of the annular housing to prevent rotation of the nuts during rotation of the bolts.

7. A coupling according to claim 6 in which the washer means comprises an annular washer positioned between the annular gasket means and the nuts.

8. A coupling according to claim 1, in which the washer means is in the form of an annular washer positioned on one side of the annular gasket means, and in which the engagement assembly includes a second annular washer which is positioned on the opposed side of the annular gasket means for the two annular washers to compress the annular gasket means axially between them during axial compression of the engagement assembly.

9. A coupling according to claim 8, in which each annular washer is split into two segments to allow positioning thereof within the engagement zone.

10. A coupling according to claim 9, in which each washer is split in diametrically opposed zones, with each split being along a split line at an angle to the polar axis of the washer.

11. A coupling according to claim 1, in which the gripping means has at least one wedge surface which is inclined towards the axial center of the coupling, and in which the wedge means comprises at least one complementary wedge surface to compress the gripping means radially inwardly upon axial compression of the engagement assembly to engage with the tubular member in the engagement zone.

12. A coupling according to claim 11, in which the coupling includes a radially inwardly directed radial flange in the engagement zone, and in which the wedge means comprises at least one complementary wedge surface on the radial flange.

13. A coupling according to claim 12, in which the wedge means further comprises at least one complementary wedge surface on the washer means.

14. A coupling according to claim 11, in which the wedge means comprises at least one complementary wedge surface on the washer means.

15. A coupling according to claim 11, in which the gripping means comprises at least one axially split gripping ring.

16. A coupling according to claim 11, in which the gripping means comprises a plurality of circumferentially spaced gripping segments which are located in position by annular retaining means, and in which the bolts extend between adjacent gripping segments.

17. A coupling according to claim 1, in which the annular gasket means and the gripping means are actuated at the same time when the bolts are actuated to axially compress the engagement assembly.

18. A coupling according to claim 1, in which the annular gasket means is positioned in a load path between the gripping means and the bolts, to maintain a resilient bias effect on the gripping means when the coupling has been made up.

19. A coupling according to claim 1, in which the annular gasket means is positioned to cooperate directly with the gripping means during axial compression of the engagement assembly.

20. A coupling according to claim 19, in which the engagement assembly further includes anti-extrusion means between the annular gasket means and the gripping means to restrict axial extrusion of the annular gasket means during use.

21. A coupling according to claim 1, in which the gripping means comprises a plurality of gripping rings, and in which the wedge means comprises a plurality of tapered wedge surfaces to cooperate with the gripping rings during use to radially compress the gripping rings.

22. A coupling according to claim 1, for use in coupling the ends of two tubular members in sealed engagement, the annular housing having a pair of engagement zones for each engagement zone to receive one of the tubular members, each engagement zone having an engagement assembly positioned therein.

23. A coupling according to claim 22, in which the housing has an inwardly extending radial flange at each of its axially opposed ends, in which the radial flanges define free ends of the engagement zones, and in which the bolts are positioned in bores in the radial flanges.

24. A coupling according to claim 1, in which the annular housing comprises a second engagement zone at an axial end opposed to the axial end proximate to which the engagement zone is provided.

25. A coupling according to claim 1, in which the gripping means comprises a metallic annular gripping ring having at least one complementary wedge surface.

* * * * *